(12) United States Patent
Willing et al.

(10) Patent No.: US 7,357,436 B2
(45) Date of Patent: Apr. 15, 2008

(54) LATCH MECHANISM FOR AUTOMOTIVE SEAT ASSEMBLY

(75) Inventors: James E. Willing, Davison, MI (US); John K. Dryburgh, North Branch, MI (US)

(73) Assignee: Toyo Seat USA Corporation, Imlay City, MI (US)

( * ) Notice: Subject to any disclaimer, the term of this patent is extended or adjusted under 35 U.S.C. 154(b) by 380 days.

(21) Appl. No.: 11/244,791

(22) Filed: Oct. 6, 2005

(65) Prior Publication Data

US 2007/0080554 A1  Apr. 12, 2007

(51) Int. Cl.
B60N 2/02  (2006.01)
(52) U.S. Cl. ............... 296/65.03; 296/65.16; 297/336; 248/503.1
(58) Field of Classification Search ............. 296/65.03, 296/65.16; 297/336, 378.1; 248/503.1
See application file for complete search history.

(56) References Cited

U.S. PATENT DOCUMENTS

| | | | |
|---|---|---|---|
| 4,759,580 A | 7/1988 | Berklich, Jr. et al. | |
| 5,125,711 A | 6/1992 | Syed et al. | |
| 5,423,582 A | 6/1995 | Kleefeldt | |
| 5,433,496 A | 7/1995 | Zimmermann | |
| 5,722,727 A | 3/1998 | Unckrich | |
| 5,730,480 A | 3/1998 | Takamura | |
| 6,022,166 A | 2/2000 | Rogers, Jr. et al. | |
| 6,065,804 A | 5/2000 | Tanaka et al. | |
| 6,250,704 B1 | 6/2001 | Garrido | |
| 6,345,867 B1 | 2/2002 | Hellrung et al. | |
| 6,412,849 B1 | 7/2002 | Fast | |
| 6,523,899 B1 | 2/2003 | Tame | |
| 6,629,710 B1 | 10/2003 | Shafry et al. | |
| 6,655,724 B1 | 12/2003 | Yoshino et al. | |
| 6,793,285 B1 | 9/2004 | Tame | |
| 6,908,137 B2 | 6/2005 | Doxey et al. | |
| 7,044,552 B2 | 5/2006 | Muller et al. | |
| 2002/0033624 A1 | 3/2002 | Konishi et al. | |
| 2005/0082865 A1 | 4/2005 | Doxey et al. | |

FOREIGN PATENT DOCUMENTS

| | | |
|---|---|---|
| EP | 1 516 771 A1 | 3/2005 |
| JP | 2006015892 A | 1/2006 |
| WO | 2005065988 A1 | 7/2005 |

*Primary Examiner*—Joseph D Pape
(74) *Attorney, Agent, or Firm*—Brooks Kushman P.C.

(57) ABSTRACT

The present invention discloses a latch mechanism for an automotive application, such as securing a seat assembly to a vehicle floor. A bracket is provided with a first link pivotally connected thereto. A second link is pivotally connected to the first link; and a third link is pivotally connected to the bracket and the second link. One of the links is provided with a hook, and selective actuation of one of the links drives the hook from a closed to an open orientation for latching the bracket to a striker. A release link is also provided for driving the linkage to a released orientation and for locking the linkage in the closed orientation.

20 Claims, 8 Drawing Sheets

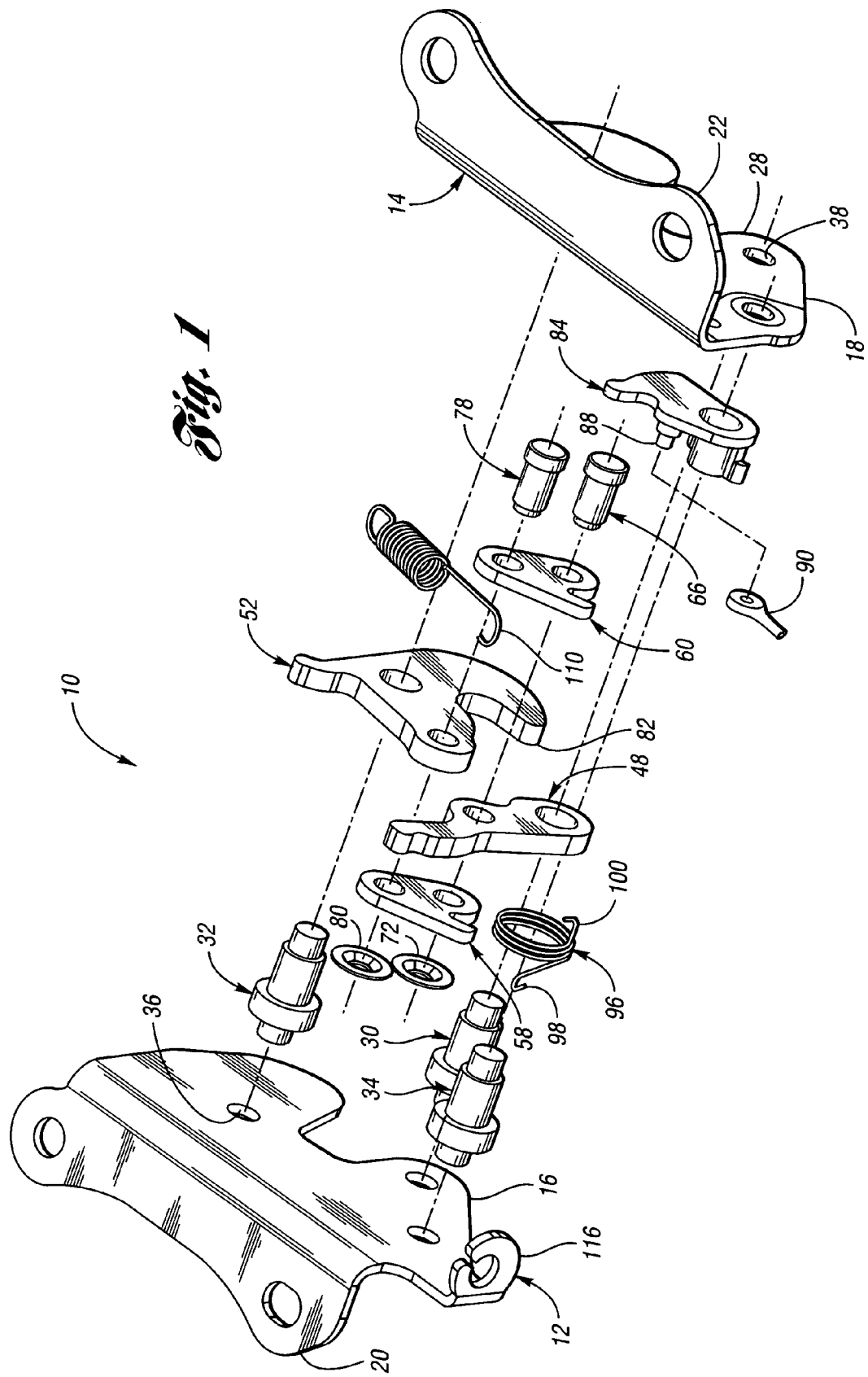

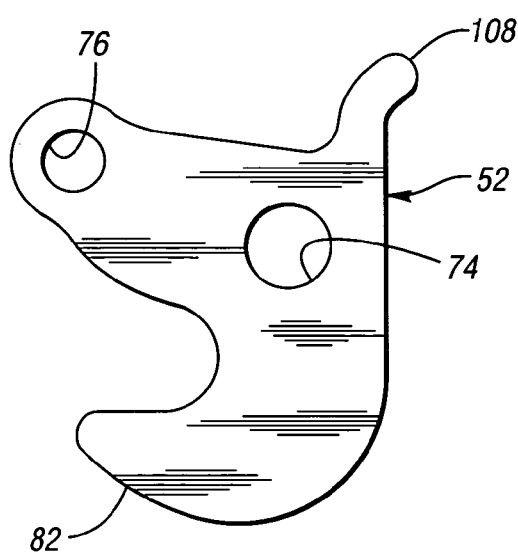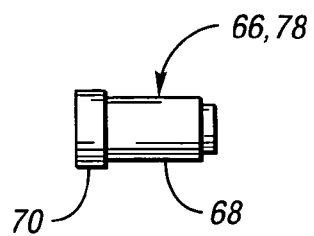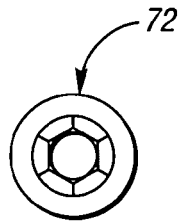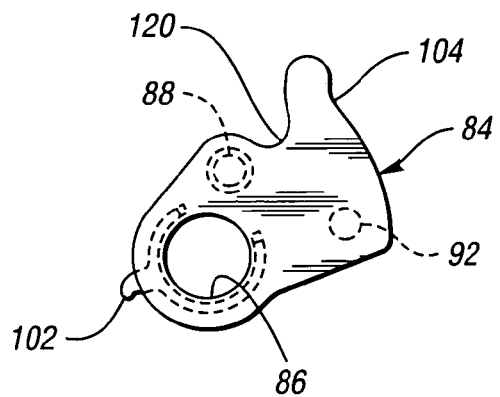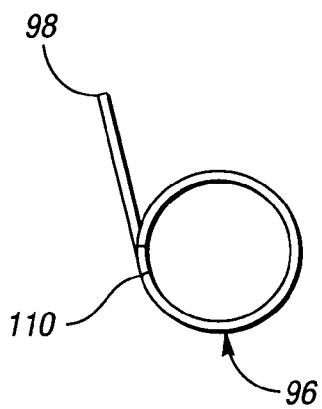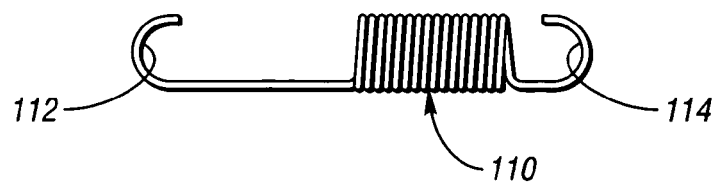

LATCH MECHANISM FOR AUTOMOTIVE SEAT ASSEMBLY

BACKGROUND OF THE INVENTION

1. Field of the Invention

The invention relates to latch mechanisms, more particularly to automotive latch mechanisms.

2. Background Art

Automotive seat assemblies often utilize latch mechanisms for securing the seat assembly to a floor of a vehicle or for securing a seat back to a seat bottom. Such latch mechanisms often include a hook pivotally mounted to a bracket of the seat assembly for securing a striker, of the floor or of the seat assembly relative to the bracket. A release member is often pivotally connected to the bracket and the release member is flexibly connected to the hook, via an extension spring such that rotation of the release member urges the hook to an open orientation. Additionally, the release member may have a contact surface that engages the hook for locking the hook in a closed orientation.

SUMMARY OF THE INVENTION

A non-limiting embodiment of the present invention provides a latch mechanism for an automotive seat assembly. The latch mechanism has a bracket, a first link pivotally connected to the bracket, a second link pivotally connected to the first link, and a third link pivotally connected to the bracket and the second link. One of the links is provided with a hook. Upon selective actuation of one of the links, the hook is driven from a closed orientation to an open orientation. The hook retains a striker within the latch mechanism.

Another non-limiting embodiment of the present invention provides a latch mechanism for an automotive seat assembly. The latch mechanism comprises a four bar linkage having a fixed link, a second link pivotally connected to the fixed link, a third link pivotally connected to the second link, and a fourth link pivotally connected to the third link and the fixed link. One of the second, third or fourth links includes a hook for receiving and retaining a striker.

The above embodiments and other embodiments, aspects, objects, features, benefits and advantages of the present invention are readily apparent when taken in combination with the accompanying drawings and the detailed description of embodiments of the present invention.

BRIEF DESCRIPTION OF THE DRAWINGS

FIG. 1 is an exploded perspective view of a latch mechanism in accordance with the present invention;

FIG. 2f is a side elevation view of a third link of the latch mechanism of FIG. 1;

FIG. 2g is a side elevation view of another pin of the latch mechanism of FIG. 1;

FIG. 2h is a side elevation view of a push nut of the latch mechanism of FIG. 1;

FIG. 2i is a side elevation view of a release member of the latch mechanism of FIG. 1;

FIG. 2j is a side elevation view of a biasing member of the latch mechanism of FIG. 1;

FIG. 2k is a side elevation view of another biasing member of the latch mechanism of FIG. 1;

FIG. 3d is a side elevation view of the latch mechanism of FIG. 1, illustrating the latch mechanism in an engaged and locked orientation, in cooperation with the striker;

DETAILED DESCRIPTION

Figure 2A:
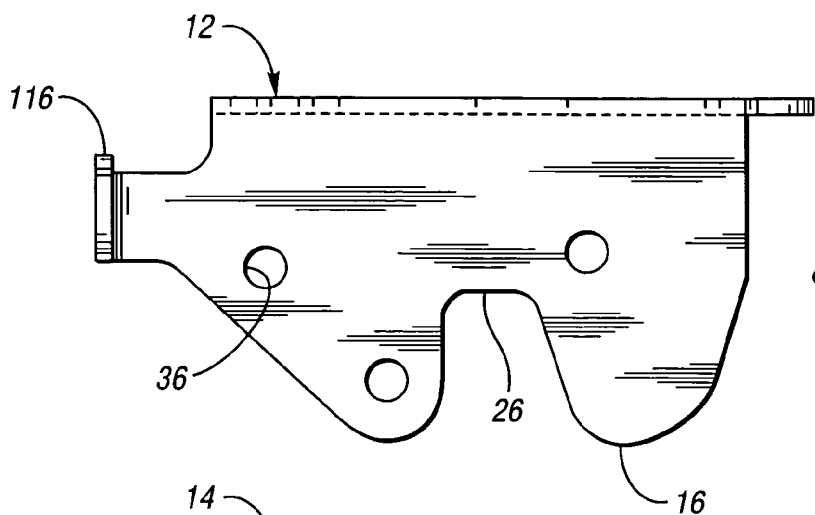
FIG. 2a is a side elevation view of a bracket of the latch mechanism of FIG. 1.
Figure 2B:
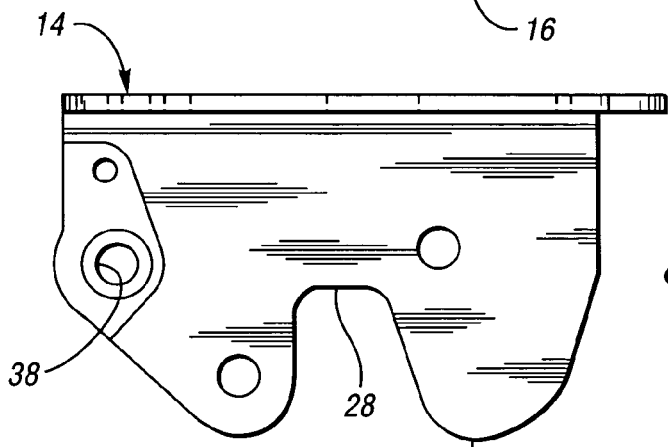
FIG. 2b is a side elevation view of another bracket of the latch mechanism of FIG. 1.
Figure 2C:
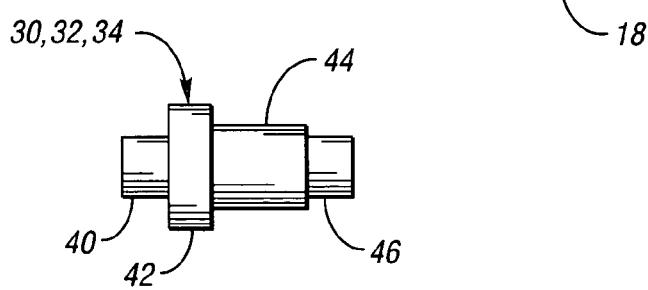
FIG. 2c is a side elevation view of a pin of the latch mechanism of FIG. 1.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

With reference now to FIGS. 1 and 3a-3d, a latch mechanism is illustrated in accordance with the present invention and is referenced generally by numeral 10. Elevation views of various components of the latch mechanism 10 are illustrated separately in FIGS. 2a-2k. The latch mechanism 10 is utilized for latching two components together within an automobile. For example, the latch mechanism 10 depicted may be utilized for latching a seat bottom to a floor of a passenger vehicle. Of course, the invention contemplates that the latch mechanism 10 may be utilized for various latching applications within a motor vehicle. For example, the latch mechanism 10 may be utilized for latching a vehicle door to a door jamb, latching a seat back to a seat bottom, or the like. Although the latch mechanism 10 is discussed with reference to latching a seat bottom to a floor of a motor vehicle, the invention contemplates various latching applications within the automotive environment.

The latching mechanism includes a bracket, which is collectively provided by a first bracket 12 and a second bracket 14. The first bracket 12 and the second bracket 14 may be formed from stamped sheet metal or any other suitable material. Each bracket 12, 14 is provided with a side plate 16, 18 respectively for retaining and housing the components of the latch mechanism 10. Each bracket 12, 14 also includes a mounting flange 20, 22 respectively. The mounting flanges 20, 22 collectively provide a mounting hole pattern for fastening the latch mechanism 10 to an underside of a seat bottom. Side elevation views of the first bracket 12 and the second bracket 14 are each provided in FIGS. 2a and 2b respectively.

With reference to FIGS. 3a-3d, the latch mechanism 10 cooperates with a striker 24. The striker 24 is secured to a floor of a motor vehicle. Specifically, the striker 24 may be mounted within a track that is recessed within the floor of the motor vehicle. In the alternative, the latch mechanism 10 may be provided on the floor of the motor vehicle, and the striker 24 may be provided on the underside of the seat bottom.

Referring again to FIG. 1, the first bracket 12 and the second bracket 14 each include a recess 26, 28 respectively formed within the profile of the side plate 16, 18. The recesses 26, 28 are sized to receive the striker 24 therein during a latching operation of the latch mechanism 10.

The latch mechanism 10 includes three pins 30, 32, 34 (FIG. 2c) retained within corresponding apertures 36, 38 formed within the side plates 16, 18 of the brackets 12, 14. Each pin 30, 32, 34 has a first end 40 received within an aperture 36 formed within the side plate 16 of the first bracket 12. Each pin 30, 32, 34 includes a shoulder 42 for abutting the side plate 16 and thereby retaining the pin 30, 32, 34 axially. The shoulder 42 is also provided for abutting a link within the latch mechanism 10 and retaining it axially relative to the brackets 12, 14. The pins 30, 32, 34 also include an external bearing surface 44 about which one of the links pivots. The pins 30, 32, 34 are also provided with a second pin end 46 for being received within one of the apertures 38 formed within the side plate 18 of the second bracket 14.

The latch mechanism 10 includes a first link 48 (FIG. 2d), a second link 50 (FIG. 2e), and a third link 52 (FIG. 2f), each translatable relative to the brackets 12, 14.

Figure 2D:
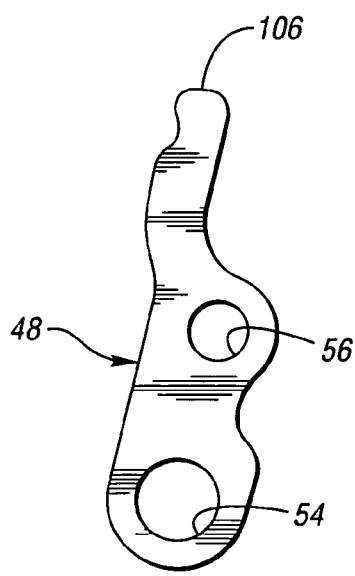
FIG. 2d is a side elevation view of a link of the latch mechanism of FIG. 1.

Referring now to FIGS. 1 and 2d, the first link 48 includes a bore 54 for receiving the bearing surface 44 of pin 30. The first link 48 is pivotal relative to the brackets 12, 14 about the pin 30. The first link 48 also includes a second bore 56 for cooperation with the second link 50.

Figure 2E:
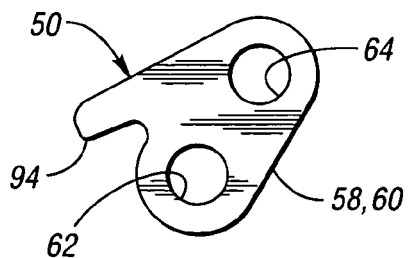
FIG. 2e is a side elevation view of another link of the latch mechanism of FIG. 1.

With reference to FIGS. 1 and 2e, the second link 50 is provided by a pair of link plates 58, 60. The link plates 58, 60 each include a first bore 62 and a second bore 64. The link plates 58, 60 are provided on opposed sides of the first link 48; and the link plates 58, 60 are pivotally connected to the first link second bore 56 by a pin 66 (FIG. 2g). The pin 66 includes an external bearing surface 68 that extends through the first bore 62 of the second link plate 60, the second bore 56 of the first link 48 and the first bore 62 of the second link plate 60. The pin 66 includes a shoulder 70 for retaining the pin 66 axially relative to the second link plate 60. A push nut 72 (FIG. 2h) retains the pin 66 axially relative to the first link plate 58.

FIGS. 1 and 2f illustrate the third link 52, which includes a first bore 74 for receiving the external bearing surface 44 of pin 32 for pivotal rotation of the third link 52 relative to the first and second brackets 12, 14. The third link 52 also includes a second bore 76 for cooperating with the second link 50. A pin 78 is provided with an external bearing surface 68 that extends through the second bore 64 of the second link plate 60, the second bore 76 of the third link 52, and the second bore 64 of the first link plate 58. A shoulder 70 of the pin 78 retains the pin 78 axially relative to the second link plate 60. A push nut 80 is provided for retaining the pin 78 axially relative to the first link plate 58.

The third link 52 includes a hook 82 for engaging and retaining the striker 24 within the recesses 26, 28 in a closed orientation of the hook 82. In an open orientation of the hook 82, the striker 24 is released.

The first link 48, second link 50 and third link 52 may each be formed from powder metal that is compressed and sintered; from stamped sheet metal; from cast metal; or the like. The first link 48, second link 50, third link 52 and the brackets 12, 14 collectively provide a four bar linkage. The first and second brackets 12, 14 provide a fixed link within the linkage, wherein the first link 48 and the third link 52 each pivot relative to the fixed link (brackets 12, 14); and the second link 50 is pivotally connected to the first link 48 and the third link 52 for controlled actuation of the first, second and third links 48, 50, 52. Although a four bar linkage is illustrated and described, the invention contemplates various four bar mechanisms within the spirit and scope of the present invention including linkages and slider-crank mechanisms.

The latch mechanism 10 includes a release link 84 as illustrated in FIGS. 1 and 2i. The release link 84 includes a bore 86 formed therethrough for receiving the external bearing surface 44 of pin 34. The release link 84 includes a first pin 88 extending therefrom for receiving a cable coupling 90. Manual actuation of a cable, which is coupled to the first pin 88 by the cable coupling 90, causes the release link 84 to pivot relative to the brackets 12, 14. The release link 84 also includes a second pin 92 extending transversely therefrom. As the release link 84 is rotated, the second pin engages a lever 94 extending from each of the link plates 58, 60 of the second link 50. Thus, as the release link 84 is rotated, the second pin 92 of the release link 84 engages the levers 94 of the second link 50 thereby actuating the latch mechanism 10. A torsion spring 96 (FIGS. 1 and 2j) is provided about the shoulder 42 of the pin 34. The torsion spring has a first end 98, which engages the first bracket 12. The torsion spring 96 also includes a second end 100, which engages a radial projection 102 of the release link 84 for biasing the release link 84 to a first orientation.

The release link 84 also includes a cam surface 104 for engaging the shoulder 70 of pin 66 for locking the latch mechanism 10 in the closed orientation of the third link 52.

The first link 48 and the third link 52 each include a lever 106, 108 respectively extending above the linkage. An extension spring 110 (FIGS. 1 and 2k) is provided having a first end 112 engaging the first link lever 106, and a second end 114 engaging the third link lever 108. The extension spring 110 urges the first link lever 106 and the third link lever 108 together thereby retaining the latch mechanism 10 in an open orientation of the hook 82, and in a closed orientation of the hook 82.

The first bracket 12 includes a cable sheath connector 116 extending generally perpendicular to the side plate 16. The cable sheath connector 116 receives a sheathed cable fitting therein (not shown). The cable is connected to a manual release lever (not shown) so that manual actuation of the lever translates the cable within the cable sheath. Such actuation of the cable urges the cable coupling 90 towards the cable sheath connector 116.

Figure 3A:
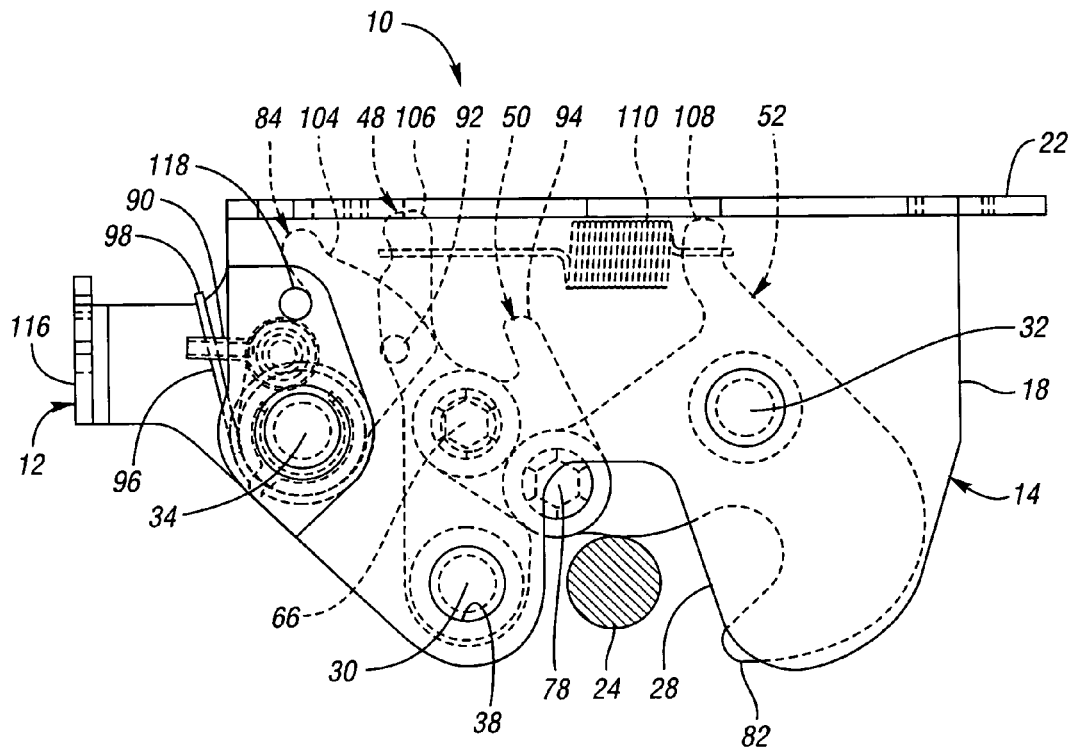
FIG. 3a is a side elevation view of the latch mechanism of FIG. 1, illustrating the latch mechanism in a released orientation thereof, in cooperation with a striker.

Referring now to FIG. 3a, the latch mechanism 10 is illustrated in a released orientation wherein the hook 82 is in an open orientation. The release link 84 is in an extended orientation, corresponding to the application of a manual force imparted through the cable to the cable coupling 90. A pin 118 is provided through the second bracket 14 for engaging a recess 120 formed within the release link 84, thereby providing a hard stop. In the absence of the manually applied force, the release link 84 is prevented from returning to the first orientation by an interference provided by the shoulder 70 of pin 66.

FIG. 3a illustrates an open orientation of the latch mechanism. In the open orientation of the latch mechanism 10, the extension spring 110 urges the first link lever 106 and the third link lever 108 together thereby urging the pivotal connection (pin 78) of the second link 50 and third link 52 away from the levers 106, 108. Thus, the extension spring 110 maintains the hook 82 in the open orientation. Additionally, a portion of the second link 50 and the third link 52 are translated into the recesses 26, 28.

Figure 3B:
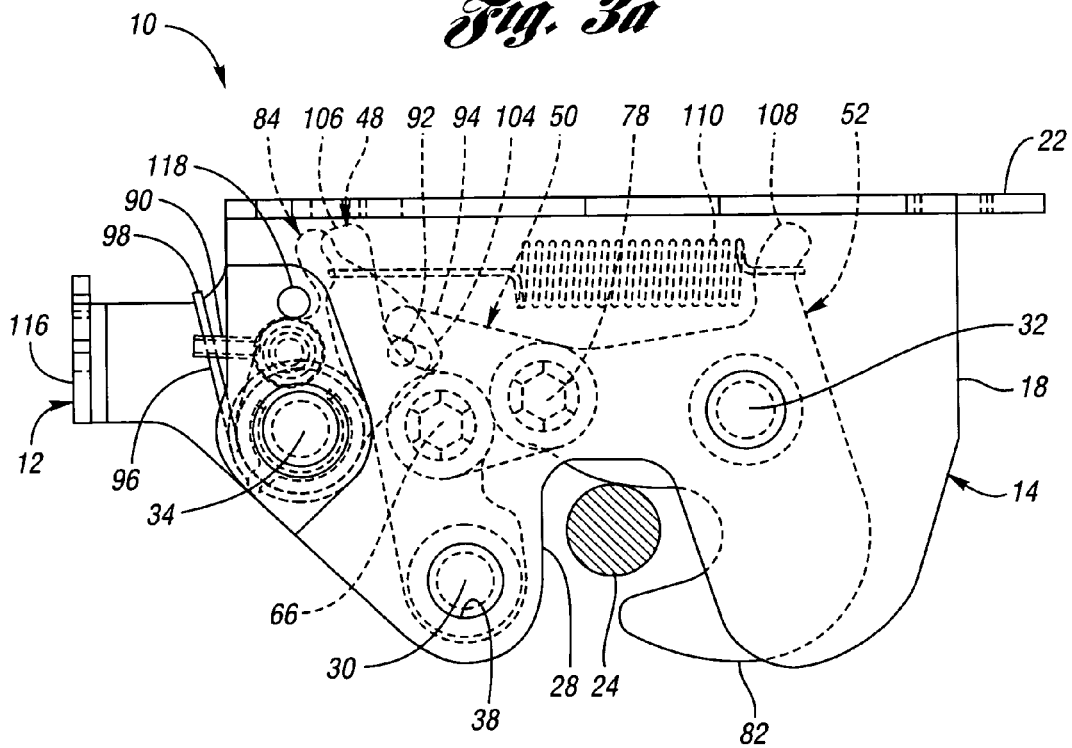
FIG. 3b is a side elevation view of the latch mechanism of FIG. 1, illustrating the latch mechanism in a partially released orientation, in cooperation with the striker.

As the latch mechanism 10 is translated relative to the striker 24, the striker 24 engages the linkage thereby actuating the linkage. As illustrated in FIG. 3b, as the striker 24 is inserted into the recesses 26, 28 and engages the second link 50 and/or the third link 52, the urge of the extension spring 110 is overcame and the third link 52 pivots about pin 32. Additionally, the pin 78 is urged towards the levers 106, 108 thereby causing the first link 48 to pivot away from the recesses 26, 28. As the pin 78 crosses between the pivotal connection (pin 66) of the first link 48 and the second link 50, and the pivotal connection (pin 32) of the third link 52 and the brackets 12, 14 (FIG. 3b), the extension spring 110 begins to urge the pin 78 upwards and towards the levers 106, 108 thereby urging the latch mechanism to a closed orientation of the hook 82.

Figure 3C:
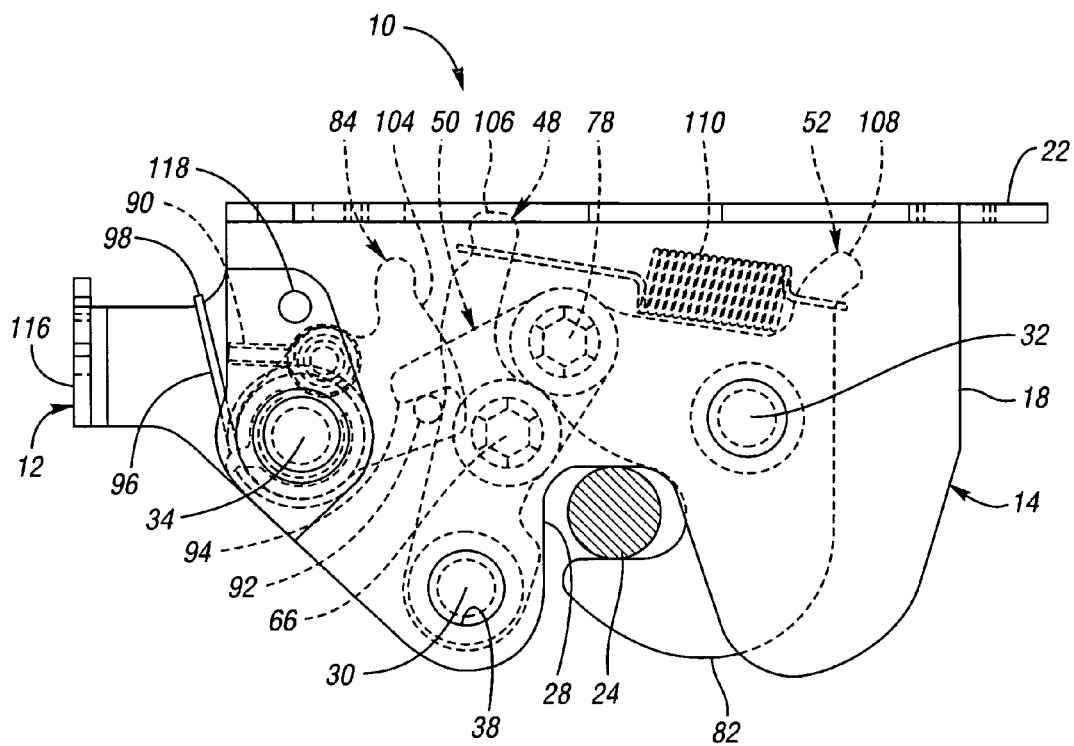
FIG. 3c is a side elevation view of the latch mechanism of FIG. 1, illustrating the latch mechanism in an engaged orientation, in cooperation with the striker.
Figure 3B:
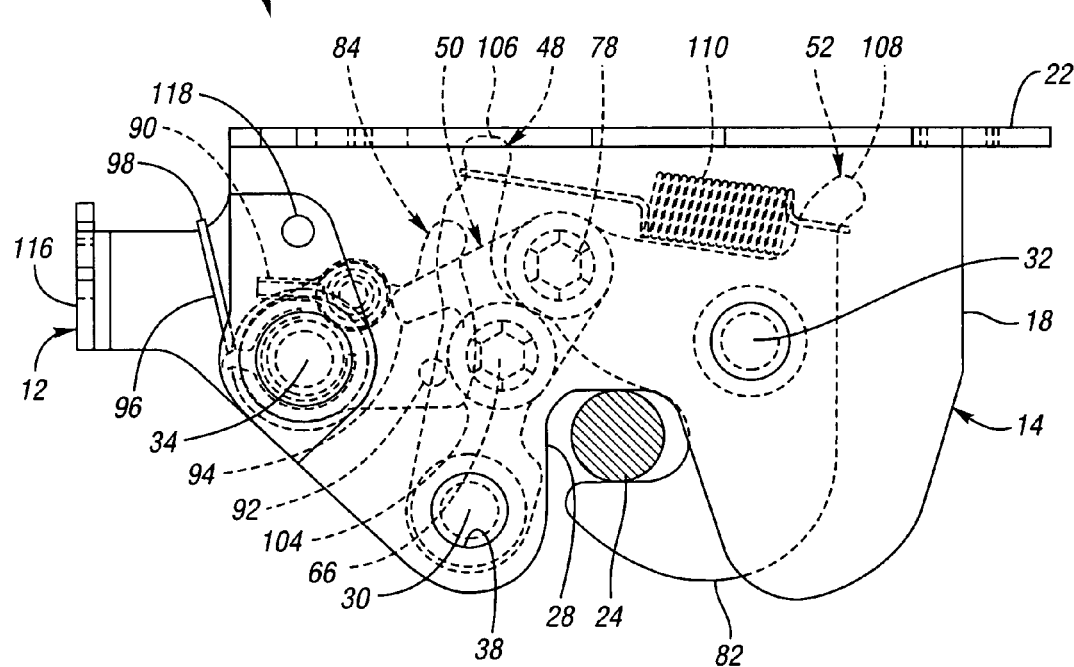

Referring now to FIG. 3c, when the striker 24 engages the recesses 26, 28, the latch mechanism 10 reaches a fully closed orientation of the hook 82. In the closed orientation, the extension spring 110 urges the levers 106, 108 together, thereby urging the pin 78 upwards and towards the levers 106, 108. This force from the extension spring 110 urges the hook 82 against the striker 24 and consequently against the recesses 26, 28. Therefore, in the closed orientation of the latch mechanism 10, a constant force is applied to the striker 24.

A design consideration of latch mechanisms includes minimizing buzz, squeak and rattle of mechanisms. Therefore, vibrations between the striker 24 and the latch mechanism 10 that are caused by operation of the vehicle should be minimized to reduce buzz, squeak and rattle. An aspect of the prior art is to provide an elastomeric bumper within a bracket recess for engaging the striker and minimizing vibrations therebetween. Another aspect of the prior art is to coat a hook of the latch mechanism with a polymeric material for reducing vibrations between the hook and the striker. Since latch mechanisms are subjected to various temperature variations, the sizes and the orientations of the striker and latch mechanism may vary. Accordingly, the prior art has incorporated the elastomeric bumper and the polymer coated hook for reducing vibrations and consequently reducing buzz, squeak and rattle.

As illustrated in FIG. 3c, the striker 24 provides a limit to the rotation of the third link 52. Therefore, the extension spring 110 causes a constantly applied force of the hook 82 to the striker 24 to the recesses 26, 28. Therefore, the need for providing a bumper or polymeric material upon the hook 82 is eliminated. Regardless of temperature variations, the hook 82 is constantly urged against the striker 24, and consequently the striker 24 is constantly urged against the recesses 26, 28. Therefore, the latch mechanism 10 of the present invention reduces components and costly manufacturing processes required in prior art latch mechanisms.

With reference now to FIG. 3d, once the latch mechanism 10 has obtained the closed orientation of the hook 82, the pin 66 no longer interferes with the release link 84. Accordingly, the torsion spring 96 urges the release link 84 to its first orientation. In the first orientation of the release link 84, the cam surface 104 engages the pin 66. This engagement of the release link 84 and the pin 66 prevents the latch mechanism 10 from being actuated to an open orientation and thereby locks the latch mechanism 10 in the closed orientation.

The linkage of the latch mechanism 10 maintains the latch position during the application of loads thereto. For example, upon application of accelerations or decelerations to the seat assembly, the striker 24 is maintained within the recesses 26, 28. The recesses 26, 28 limit translation of the striker 24 relative to the brackets 12, 14 within a generally vertical direction only. Such application of a load that may result in vertical loading upon the striker 24 is translated through the linkage to a generally transverse load against the release link 84. Thus, adverse loads are distributed through the latch mechanism 10 and the striker 24 remains locked within the latch mechanism 10 absent a manually applied force to the release link 84.

The torsion spring 96 contributes to the constant force applied to the striker 24. The torsion spring 96 urges the cam surface 104 against the pin 66, thereby urging the first link 48 towards the recesses 26, 28. Consequently, the first link 48 urges the second link 50 towards the lever ends 106, 108 which consequently urges the hook 82 in the closed direction. Therefore, the torsion spring 96 also assists in reducing buzz, squeak and rattle.

Upon application of a manually applied force through the cable, the cable coupling 90 drives the release link 84 about the pin 34. As the release link 84 is rotated from the position illustrated in FIG. 3d to the position illustrated in FIG. 3c, the second pin 92 of the release link 84 engages the levers 94 of the second link 50. As the release link 84 continues to rotate, the pivotal connection of the second link 50 and the third link 52 is driven downwards towards the recesses 26, 28 as illustrated in FIG. 3b. Thus, the manually applied force overcomes the bias of both the torsion spring 96 on the release link 84 and the bias of the extension spring 110 on the first link 48 and the third link 52. Once the pin 78 crosses over center between the pin 66 and the pin 32, the extension spring 110 urges the levers 106, 108 together thereby actuating the latch mechanism 10 to the fully open position as illustrated in FIG. 3a.

Additionally, as the release link 84 continues to rotate, the recess 120 engages the pin 118 there providing a limit to the range of rotation of the pivot link 84. Upon release of the manually applied force, the torsion spring 96 urges the release link 84 until it engages the pin 66. The pin 66 prevents the release link 84 from returning to the first or locked position until the hook 82 is closed.

Figure 4A:
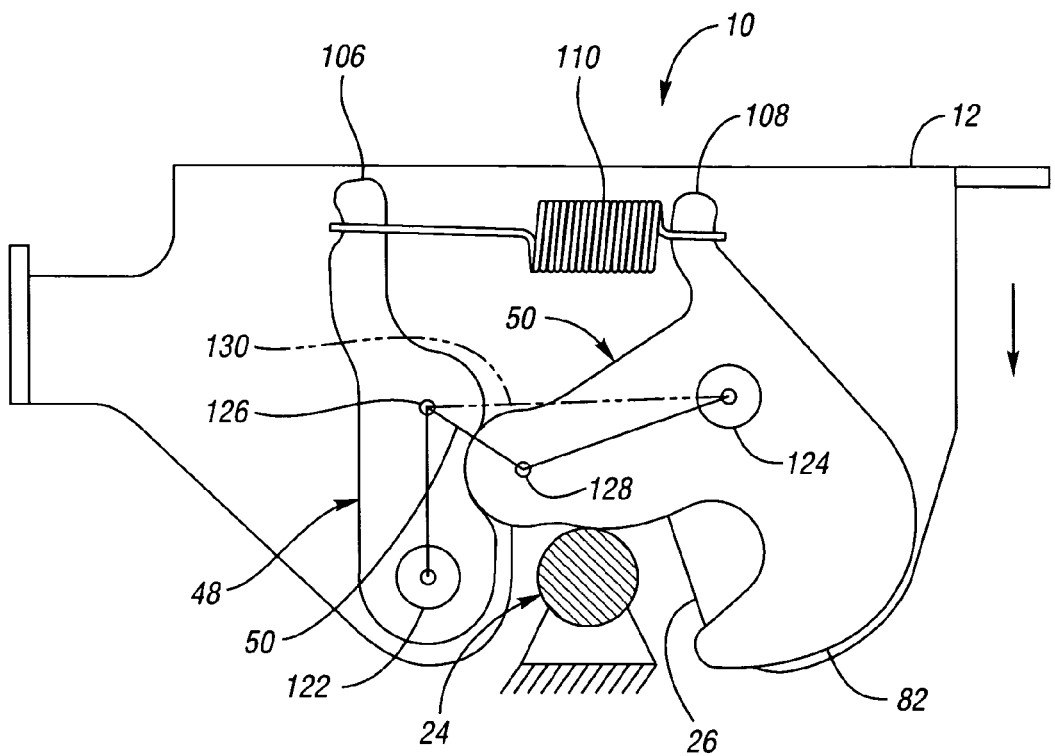
FIG. 4a is a side elevation schematic view of the latch mechanism of FIG. 1, illustrating a cooperation of a linkage and a hook of the latch mechanism in a released orientation.
Figure 4B:
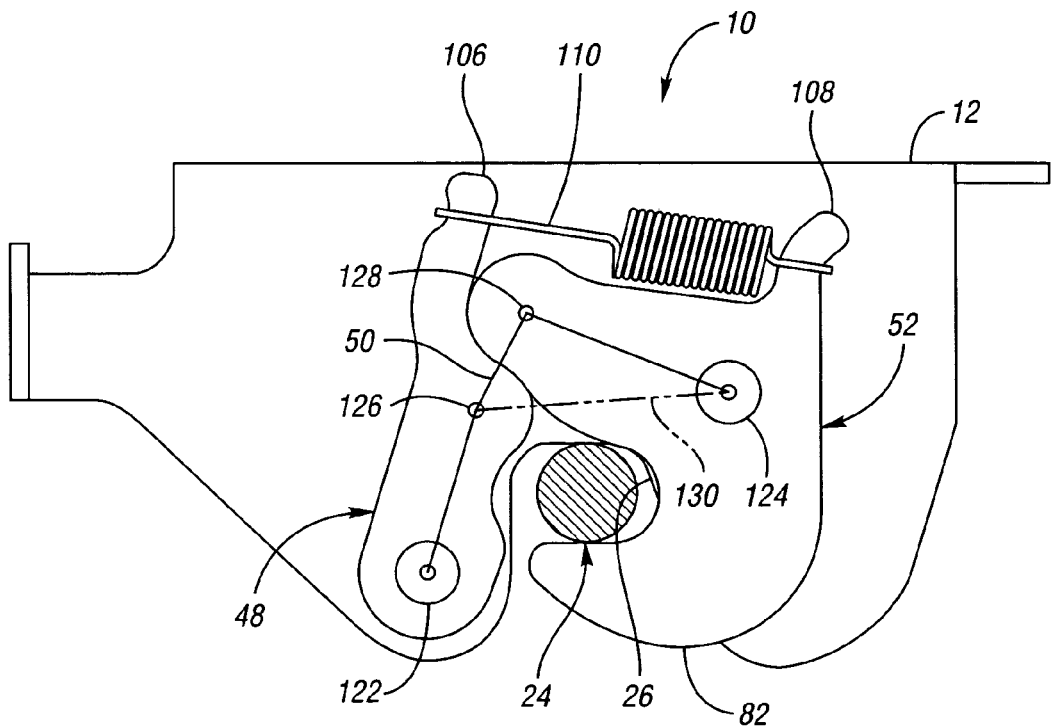
FIG. 4b is a side elevation schematic view of the latch mechanism of FIG. 1, illustrating the linkage and the hook in an engaged orientation.

FIGS. 4a and 4b illustrate the latch mechanism 10 schematically for a detailed explanation of the cooperation of the linkage and the hook 82 with the striker 24. The striker 24, in the embodiment illustrated, is fixed relative to the vehicle. Since the latch mechanism 10 is provided on a seat of the vehicle, the latch mechanism 10 is translated relative to the striker 24. Thus, the latch mechanism 10 travels in the direction of the downward arrow in FIG. 4a. As the latch mechanism 10 translates relative to the striker 24, the striker 24 engages the linkage and actuates the linkage from a released orientation as illustrated in FIG. 4a to the closed orientation illustrated in FIG. 4b.

The linkage of the latch mechanism 10 is illustrated simplified in FIGS. 4a and 4b. A fixed link is provided by the brackets 12, 14 between pivotal connection 122 with the first link 48, and pivotal connection 124 with the third link 52. The first link 48 is pivotally connected to the second link 50 at pivotal connection 126. The second link 50 and the third link 52 are pivotally connected at pivotal connection 128. As the extension spring 110 urges the first link lever 106 and the third link lever 108 together, pivotal connection 126 is urged towards pivotal connection 124, thereby urging pivotal connection 128 downwards. An imaginary line 130 is illustrated extending from pivotal connection 126 to pivotal connection 124. The imaginary line 130 illustrates a line between these pivotal connections 124, 126, wherein the extension spring 110 urges the pivotal connection 128 away from the imaginary line 130. Thus, the extension spring 110 cooperates with the linkage to urge the hook 52 into the released orientation, which is illustrated in FIG. 4a when the pivotal connection 128 is beneath the imaginary line 130.

As the latch mechanism 10 is further translated relative to the striker 24, the striker 24 engages the third link 52 and urges the pivotal connection 128 towards the imaginary line 130, thereby urging the first link 48 to rotate in a counterclockwise direction in FIG. 4a, causing the extension spring 110 to extend. Upon translation of the pivotal connection 128 through imaginary line 130, or in other words crossing between the pivotal connections 126 and 124, the extension spring 110 urges pivotal connections 124 and 126 towards one another thereby urging the pivotal connection 128 upward and away from the imaginary line 130 as illustrated in FIG. 4b. Thus, as the latch mechanism 10 is translated relative to the striker 24, the striker 24 engages the third link 52 and causes the pivotal connection 128 to cross through imaginary line 130. Once the pivotal connection 128 passes through the imaginary line 130, the extension spring 110 retracts the linkage into the locked orientation illustrated in FIG. 4b. Further, the extension spring 110 applies a continuous bias to the linkage urging the pivotal connection 128 upwards, thereby applying a continuous clamping force of the hook 82 against the striker 24.

In the engaged orientation of the latch mechanism 10 illustrated in FIG. 4b, the latch mechanism 10 becomes locked when the release link 84 extends within the range of travel of the first link 48, thereby preventing the first link 48 from rotating in a counterclockwise direction, as illustrated in FIG. 3d.

Figure 5A:
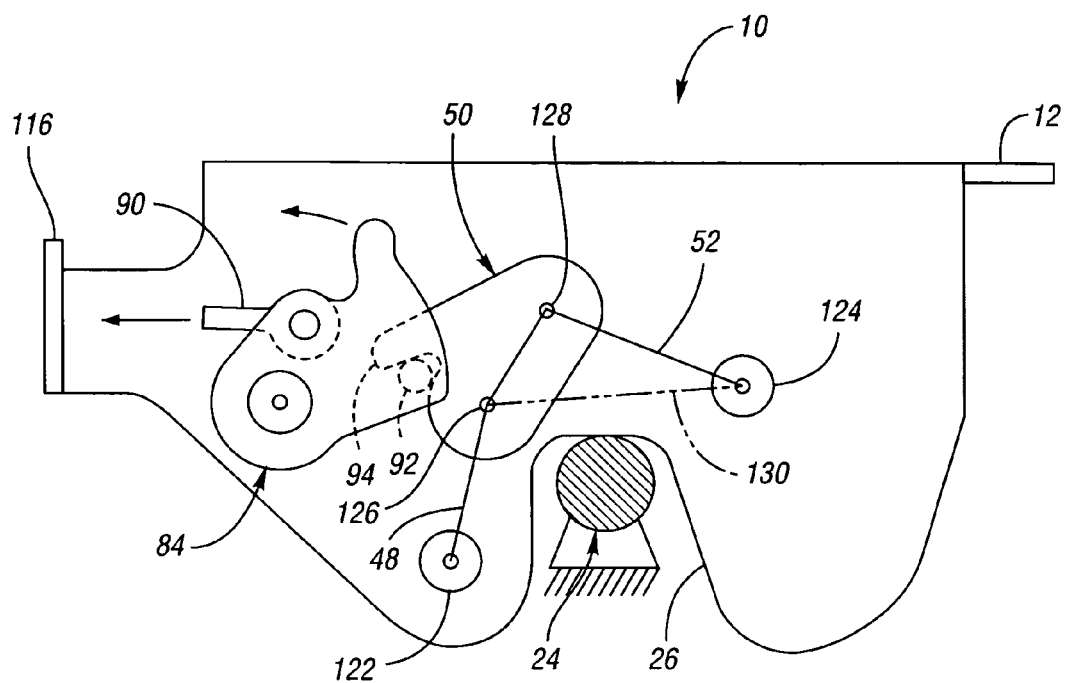
FIG. 5a is a side elevation schematic view of the latch mechanism of FIG. 1, illustrating cooperation of the linkage and the release member in an engaged and unlocked orientation.

With reference now to FIG. 5a, the latch mechanism 10 is illustrated simplified for depicting the cooperation of the release link 84 and the linkage of the latch mechanism 10. FIG. 5a illustrates the latch mechanism 10 in the engaged position of the hook 82, which is also illustrated in FIGS. 3d and 4b. As a user manually actuates a release lever, the cable urges the cable coupling 90 towards the cable sheath connector 116 which is indicated by the leftward arrow in FIG. 5a.

Figure 5B:
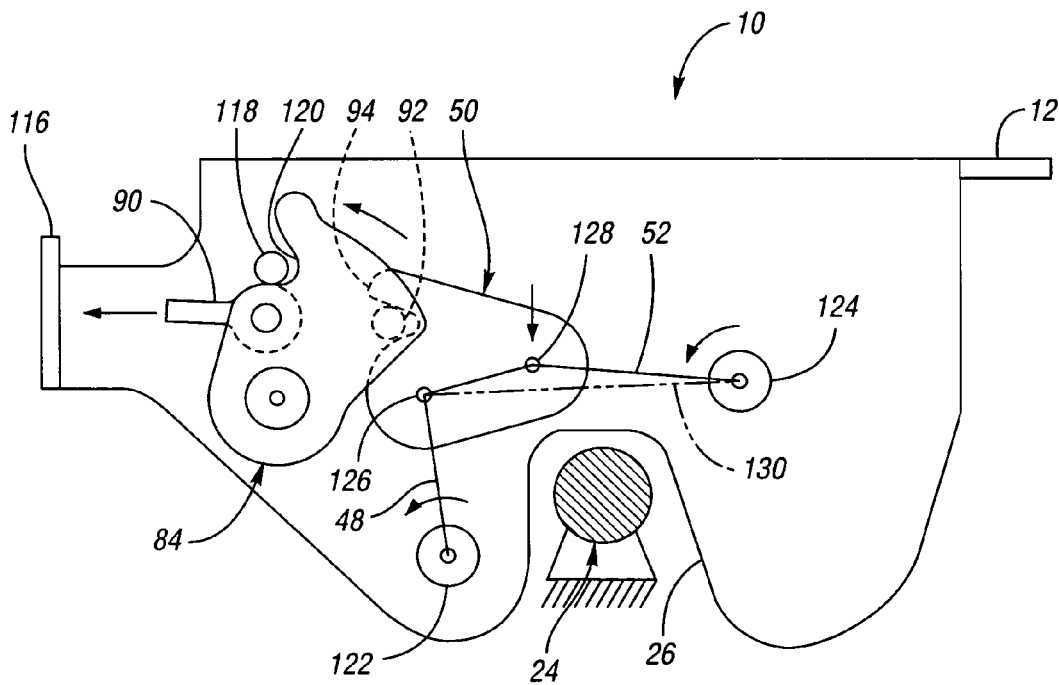
FIG. 5b is a side elevation schematic view of the latch mechanism of FIG. 1, illustrating the linkage and the release member in a partially released orientation.

As the cable coupling 90 is urged to the left in FIG. 5a, the release link 84 is rotated out of the locked position of FIG. 3d until the second pin 92 of the release link 84 engages the lever 94 of the second link 50. As the cable coupling 90 continues to translate towards the cable sheath connector 116, the release link 84 continues to rotate in a counterclockwise direction as illustrated by the arcuate arrows in FIGS. 5a and 5b. As the release link 84 rotates in the counterclockwise direction, the second pin 92 actuates the lever 94 such that pivotal connection 128 is driven towards the imaginary line 130, thus overcoming the bias of the extension spring 110. As the pivotal connection 128 is urged downward, the first link 48 is rotated in a counterclockwise direction as illustrated by the arcuate arrow in FIG. 5b and the third link 52 is rotated in counterclockwise direction as illustrated by the arcuate arrow in FIG. 5b.

Figure 5C:
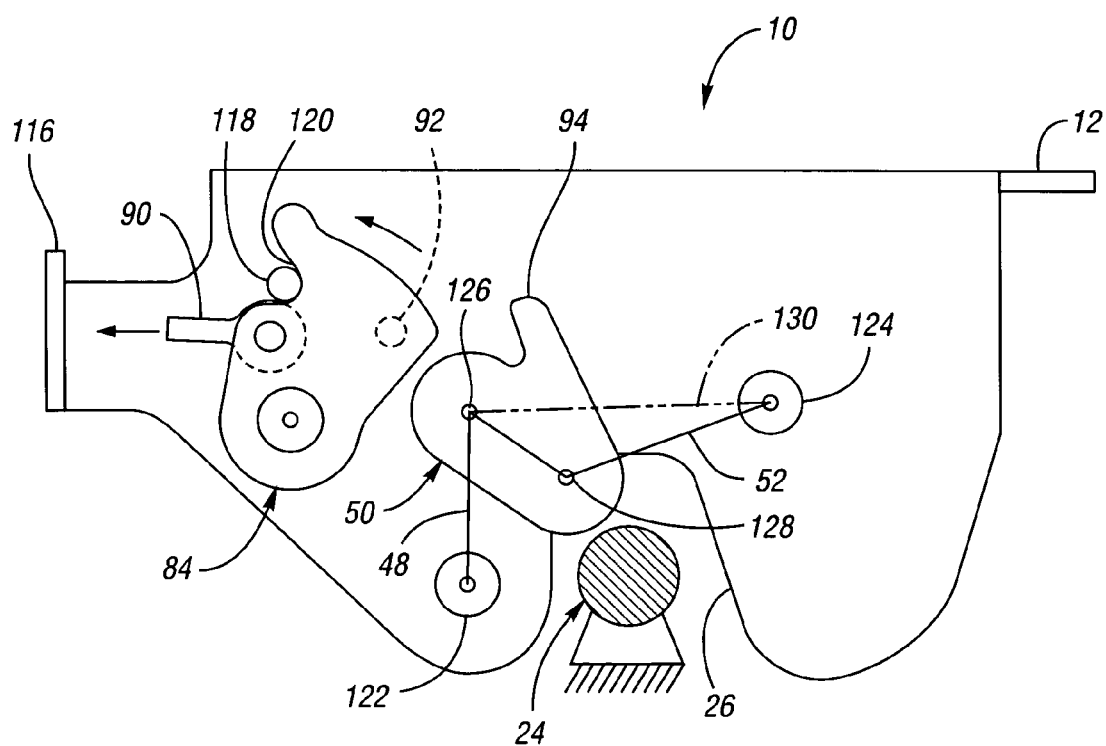
FIG. 5c is a side elevation schematic view of the latch mechanism of FIG. 1, illustrating the linkage and the release member in a released orientation.

As the release link 84 is further rotated, the pivotal connection 128 crosses over the imaginary line 130 and therefore the extension spring 110 continues the translation of the pivotal connection 128 downwards to the fully open orientation of the latch mechanism 10 as illustrated in FIG. 5c. The release link 84 may be rotated until the recess 120 engages the pin 118 as illustrated in FIG. 5c, thus providing a hard stop for limiting the rotation of the release link 84. Once the user releases the release lever, the torsion spring 96 urges the release link downward, but due to interference with the second link 50, the release link 84 does not reach the locked orientation, thereby leaving the latch mechanism unlocked in the released orientation of the hook 82.

In summary, a latch mechanism for a motor vehicle application is disclosed that is sufficient to support the applied loads, conducive to manual actuation, reduces costly manufacturing steps, and minimizes undesirable buzz, squeak and rattle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A latch mechanism for securing an automotive seat assembly to a floor of a motor vehicle comprising:
   a bracket adapted to be affixed to one of a seat assembly or a floor of a motor vehicle, the bracket having a recess formed therein sized to receive a striker affixed to the other of the seat assembly or the floor of the motor vehicle;
   a first link pivotally connected to the bracket;
   a second link pivotally connected to the first link;
   a third link pivotally connected to the bracket and the second link; and
   a hook formed on one of the first link, the second link or the third link proximate to the recess, the hook having an open orientation relative to the bracket for receiving the striker within the bracket recess, and the hook having a closed orientation for retaining the striker within the bracket recess;
   wherein selective actuation of one of the first link, the second link or the third link drives the hook from the closed orientation to the open orientation.

2. The latch mechanism of claim 1 wherein the bracket, the first link, the second link and the third link collectively define a four bar linkage.

3. The latch mechanism of claim 1 further comprising a biasing member engaging the hook for maintaining the hook in the closed orientation.

4. The latch mechanism of claim 1 further comprising a biasing member engaging the hook for maintaining the hook in the open orientation.

5. The latch mechanism of claim 1 wherein the striker is retained between the hook and the bracket recess in the closed orientation of the hook.

6. The latch mechanism of claim 1 wherein one of the first link, the second link and the third link is adapted to engage the striker upon receipt of the striker within the bracket recess, thereby driving the hook to the closed orientation.

7. The latch mechanism of claim 1 wherein the bracket further comprises a pair of brackets for housing the first link, the second link and the third link therebetween.

8. The latch mechanism of claim 1 wherein the first link further comprises a lever extending therefrom;
wherein the third link further comprises a lever extending therefrom; and
wherein the latch mechanism further comprises an extension spring having a first end connected to the first link lever and a second end connected to the third link lever for translating the pivotal connection of the second link and the third link away from the first link and third link levers in the open orientation of the hook thereby maintaining the open orientation of the hook, and for translating the pivotal connection of the second link and the third link towards the first link and third link levers in the closed orientation of the hook thereby maintaining the closed orientation of the hook.

9. The latch mechanism of claim 8 wherein the rotational translation of the hook towards the closed orientation is limited by the striker such that the extension spring causes the hook to apply a constant force against the striker within the bracket recess, thereby minimizing vibration therebetween.

10. The latch mechanism of claim 1 further comprising a release member translatably mounted to the bracket, the release member being adapted for manual actuation, the release member operatively cooperating with one of the first link, the second link and the third link for actuating the one of the first link, the second link and the third link from a first orientation to a second orientation thereby driving the hook from the closed orientation to the open orientation.

11. The latch mechanism of claim 10 further comprising a cable coupling pivotally connected to the release member for translating a manually applied force through the cable to the release member for translating the release member.

12. The latch mechanism of claim 11 wherein the bracket further comprises a cable sheath connector for mounting a cable sheath thereto so that the cable may extend from the cable sheath to the cable coupling.

13. The latch mechanism of claim 10 wherein the release member is pivotally connected to the bracket such that upon manual actuation of the release member, the release member pivots from a first orientation relative to the bracket to a second orientation, and the release member further comprises a cam surface for interfering with a path of translation of one of the first link, the second link and the third link in the first orientation of the release member, thereby locking hook in the closed orientation.

14. The latch mechanism of claim 13 further comprising a biasing member for urging the release member towards the first orientation absent a manually applied force so that the cam surface urges one of the first link, the second link and the third link towards a respective orientation corresponding with the closed orientation of the hook for causing the hook to apply a constant force against the striker within the bracket recess, thereby minimizing vibration therebetween.

15. The latch mechanism of claim 10 wherein one of the first link, the second link and the third link further comprises a lever extending therefrom; and
wherein the release member further comprises a projection extending therefrom and the release member is pivotally connected to the bracket such that upon manual actuation of the release member, the release member pivots from a first orientation relative to the bracket to a second orientation, and consequently the release member projection engages the lever for actuating the one of the first link, the second link and the third link, thereby driving the hook from the closed orientation to the open orientation.

16. The latch mechanism of claim 15 wherein the second link further comprises the lever.

17. The latch mechanism of claim 10 further comprising a biasing member for returning the release member to the first orientation absent a manually applied force.

18. The latch mechanism of claim 17 wherein the biasing member is further defined as a torsion spring.

19. A latch mechanism for securing an automotive seat assembly to a floor of a motor vehicle comprising:
a four bar mechanism including:
a fixed link adapted to be affixed to one of a seat assembly or a floor of a motor vehicle,
a first translatable link pivotally connected to the fixed link,
a second translatable link pivotally connected to the first translatable link, and
a third translatable link pivotally connected to the second translatable link and pivotally connected to the fixed link;
wherein one of the translatable links includes a hook having an open orientation relative to the fixed link for receiving a striker that is affixed to the other of the seat assembly or the floor of the motor vehicle, and the hook having a closed orientation for retaining the striker relative to the fixed link.

20. A latch mechanism for an automotive seat assembly comprising:
a bracket adapted to be affixed to one of a seat bottom, a seat back or a floor of a motor vehicle, the bracket having a recess formed therein sized to receive a striker affixed to another of the seat bottom, the seat back or the floor of the motor vehicle;
a first link pivotally connected to the bracket;
a second link pivotally connected to the first link;
a hook pivotally connected to the bracket proximate to the recess, the hook being pivotally connected to the second link and driven thereby, the hook having an open orientation relative to the bracket for receiving the striker within the bracket recess, and the hook having a closed orientation for retaining the striker within the bracket recess; and
a release member pivotally connected to the bracket such that upon manual actuation of the release member, the release member pivots from a first orientation relative to the bracket to a second orientation, the release member operatively cooperating with one of the first and second links for actuating the one of the first and second links from a first orientation to a second orientation thereby driving the hook from the closed orientation to the open orientation, and the release member having a cam surface for interfering with a path of translation of one of the first link, the second link and the hook in the first orientation of the release member, thereby locking hook in the closed orientation.

* * * * *